(12) United States Patent
Tomura

(10) Patent No.: US 7,421,228 B2
(45) Date of Patent: Sep. 2, 2008

(54) IMAGE FORMING APPARATUS HAVING UPPER AND LOWER BODIES

(75) Inventor: Hisayuki Tomura, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 11/258,200

(22) Filed: Oct. 26, 2005

(65) Prior Publication Data

US 2006/0093210 A1     May 4, 2006

(30) Foreign Application Priority Data

Oct. 29, 2004     (JP)  ............... 2004-316114

(51) Int. Cl.
*G03G 15/00*     (2006.01)
(52) U.S. Cl. ...................... 399/118; 399/125
(58) Field of Classification Search ................ 399/110, 399/118, 125, 177, 365, 367, 377, 379, 38; 355/75; 347/108, 152, 222, 263; 358/496, 358/497, 498
See application file for complete search history.

(56) References Cited

U.S. PATENT DOCUMENTS

| 5,206,681 | A | | 4/1993 | Otomo et al. ............... 355/200 |
|---|---|---|---|---|
| 5,260,743 | A | * | 11/1993 | Sakamoto ...................... 399/4 |
| 5,276,480 | A | * | 1/1994 | Takahashi ................... 399/125 |
| 5,532,826 | A | * | 7/1996 | Miyao et al. ................. 358/296 |
| 6,167,222 | A | * | 12/2000 | Lee .............................. 399/124 |
| 6,434,350 | B2 | * | 8/2002 | Kikuchi et al. .............. 399/124 |
| 6,510,301 | B2 | * | 1/2003 | Tanaka ........................ 399/125 |
| 6,674,983 | B2 | * | 1/2004 | Enomoto et al. ............ 399/124 |
| 7,133,626 | B2 | * | 11/2006 | Kaiga et al. ................. 399/110 |
| 7,199,910 | B2 | * | 4/2007 | Manabe et al. .............. 358/474 |
| 2006/0093210 | A1 | | 5/2006 | Tomura ....................... 382/162 |

FOREIGN PATENT DOCUMENTS

| JP | 2-16363 | | 2/1990 |
|---|---|---|---|
| JP | 2-52365 | | 2/1990 |
| JP | 4-66424 | | 3/1992 |
| JP | 04359263 | A * | 12/1992 |
| JP | 5-19543 | | 1/1993 |
| JP | 05048785 | A * | 2/1993 |
| JP | 6-324529 | | 11/1994 |
| JP | 07261490 | A * | 10/1995 |

* cited by examiner

*Primary Examiner*—Robert Beatty
(74) *Attorney, Agent, or Firm*—Fitzpatrick, Cella, Harper & Scinto

(57) ABSTRACT

The image forming apparatus includes a lower body, an upper body openable from and closable to the lower body, the upper body including a device for forming an image and a support member for supporting the upper body when the upper body is opened, wherein a fastening portion for fastening the upper body and the support member is exposed when the device is detached from the upper body. Thus an influence of the weight of the upper body can be alleviated and the support member supporting the upper body can thus be safely replaced.

10 Claims, 14 Drawing Sheets

IMAGE FORMING APPARATUS HAVING UPPER AND LOWER BODIES

BACKGROUND OF THE INVENTION

1. Field of the Invention

The present invention relates to an image forming apparatus such as a copying apparatus, a printer, or a facsimile apparatus, and more particularly to an apparatus in which an upper body is opened from and closed to a lower body.

2. Related Background Art

In an image forming apparatus for executing an image formation by an electrophotographic process, there is known a configuration in which the apparatus is divided into an upper part and a lower part, in order to facilitate a process of removing a sheet jamming at the recording operation or a work of inspection and maintenance. Such configuration is known as a clam shell type in which an upper body can be opened from and closed to a lower body.

In such image forming apparatus, the upper body becomes considerably heavy as it includes for example an image reading apparatus.

The upper body of such considerable weight requires a large operating force for opening and closing. Consequently, in such image forming apparatus, an elastic member such as a gas spring is provided between the upper body and the lower body.

Such elastic member allows to open the upper body automatically or with a small operating force.

However, such gas spring may become weaker in the repulsive force by a deterioration in time, thus becoming unable to provide a necessary opening amount. Also such gas spring requires a cumbersome work for replacement, as it has a very strong elastic power and is fixed on both ends.

Therefore, Japanese Patent Application Laid-Open No. H06-324529 discloses a proposal for the replacement of the gas spring.

In the following a procedure of gas spring replacement will be explained with reference to FIG. 14, also quoting Japanese Patent Application Laid-Open No. H06-324529.

A prior gas spring 1004 has both ends as indicated by 1004a, 1004b in FIG. 14. The upper end 1004a of the gas spring has a C-shaped recess (grooved portion or rotatable portion) in order that it can rotate on a mounting pin 1006a. This portion, merely impinging on a mounting member on the main body, can be detached from the main body by slightly lifting an upper frame member 1006 of the main body or by slightly contracting the gas spring.

At the lower end 1004b of the gas spring, a rod of the gas spring 1004 has a rounded end which is mounted on a recessed support member 1006 in a rotatable manner. Thus the dismounting can be achieved by detaching the upper side of the gas spring and then extracting the gas spring, thus not requiring any tool and within a limited work space.

However, the above-described prior configuration poses following difficulties when the gas spring 1004, supporting the upper frame member 1006 of the main body, is detached from the mounting pin 1006a shown in FIG. 14. The dismounting operation is difficult to execute for the replacing workman (for example service personnel) as he has to hold the gas spring 1004 in one hand and to support the considerably heavy upper frame member 1006 of the main body by another hand.

Also in case the upper frame member 1006 of the main body is left free by mistake, the considerably heavy upper frame member 1006 may close forcibly, and may impair the safety of the workman in replacing work.

SUMMARY OF THE INVENTION

An object of the present invention is to provide an image forming apparatus having an upper body openable from and closable to a lower body, capable of alleviating an influence of a weight of the upper body thereby enabling a safe replacement of a support member which supports the upper body.

Another object of the present invention is to provide an image forming apparatus including a lower body, an upper body which is openable from and closable to the lower body, and a support member for supporting the upper body when the upper body is opened, wherein the upper body includes a device for forming an image and a fastening portion for fastening the upper body and the support member is exposed when the device is detached from the upper body.

Still other objects of the present invention will become fully apparent from the following description.

DETAILED DESCRIPTION OF THE PREFERRED EMBODIMENTS

Figure 1:
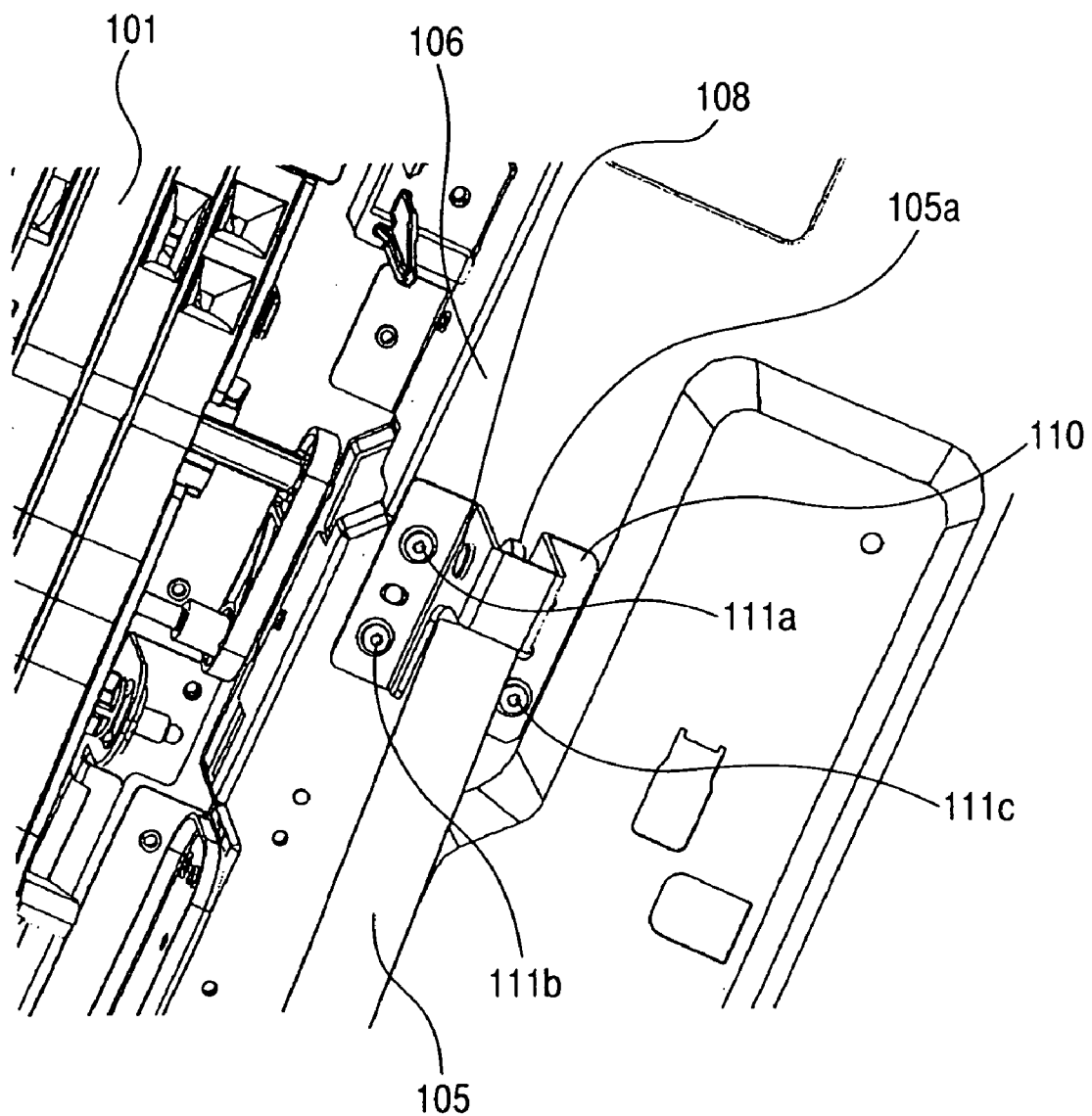
FIG. 1 is a schematic perspective view, seen from below, of a support mechanism of an upper body in an embodiment of the present invention.

In the following, the present invention will be explained in detail with reference to the accompanying drawings. However, in such embodiments, a dimension, a material, a shape of constituent component and a relative positioning thereof may be suitably changed according to a configuration of the apparatus and various conditions in which the present invention is applied, and should not be construed to restrict the scope of the invention to the following embodiments.

Embodiment 1

Now an image forming apparatus of the present invention will be schematically explained with reference to FIGS. 9 and 10, which are respectively a schematic cross-sectional view of an image forming apparatus of an embodiment 1 of the present invention, and a schematic perspective view of a main body thereof.

There are illustrated a main body 1 of the image forming apparatus, an image forming portion 2 constituted of a laser beam printer, a cassette feed portion 3 containing plural sheets or recording materials S and conveying the sheets S one by one, an MP (multi paper) feed portion 4, a sheet conveying portion 5, a control portion 6 for the entire image forming apparatus, a fixing portion 7, a discharge portion 8 for reversing and discharging the recording material, a recording material conveying portion 9 for forming images on both sides of the recording material, an original conveying portion 10 for conveying originals D in a plural stack one by one, an image reading portion 11 for reading image information of the original D, and an operation unit 12 constituted for example a display portion and input keys.

As will be explained in more detail, the main body of the apparatus is divided into an upper body (an upper portion of the main body of the apparatus) and a lower body (an lower portion of the main body of the apparatus), and the upper body can be opened from and closed to the lower body. The upper body includes the original conveying portion 10, the image reading portion 11, the operation unit 12 etc. The original conveying portion 10, the image reading portion 11, the operation unit 12 etc. constitute devices for forming an image. The lower body includes the image forming portion 2, the cassette feeding portion 3, the MP feeding portion 4, the sheet conveying portion 5, the control portion 6, the fixing portion 7, the discharge portion 8, the recording material conveying portion 9 etc.

In the following, each device will be explained.

(Reader)

The image reading portion 11 is provided, on an upper surface thereof, with an original support glass 601, a running-reading glass 602, and a jump table 603.

Above the image reading portion 11 (above the aforementioned upper surface), an original conveying portion 10 provided with an original pressure plate 604 is supported by an unillustrated hinge, positioned behind the operation unit 12. In the main body 1 of the present embodiment, a side of the operation unit 12 (a side of the main body 1 of the apparatus where an operator on the operation unit 12 stands) shall be referred to as "front".

The image reading portion 11 is provided therein, as image reading means, with a contact image sensor 606, a carriage 607, a guide shaft 608, a timing belt 609, a driving pulley 610 and an image processing relay board 611. In the image reading portion 11, an original size detection sensor 612 may be provided optionally.

The contact image sensor 606 is provided with a one-dimensional photoelectric conversion device, a SELFOC lens (trade mark), and light source positioned on both sides of the SELFOC lens, which are not illustrated and is constructed as a device containing these components in a casing.

The contact image sensor 606 is elastically supported by an unillustrated spring on the carriage 607 and is thus urged toward the original supporting glass 601, thus maintaining a constant distance in such a manner that the distance to the original D positioned on the original supporting glass 600 is within a depth of focus. The carriage 607 is connected to a timing belt 609 driven by a reading drive motor 613, and executes a reciprocating motion within the image reading portion 11, along a guide. shaft 608 perpendicular to the one-dimensional photoelectric converting device in the contact image sensor 606.

A position of the contact image sensor 606 is controlled by a rotation frequency and a rotation time of the reading drive motor 613, based on a detection timing of a home position sensor 614.

When the original D is placed on the original supporting glass 601 and the original conveying portion 10 including the original pressure plate 604 is closed, a size of the original is detected by the original size sensor 612 is detected at a predetermined open-close angle.

When a copy start signal is transmitted, a sheet of a predetermined size is selected according to the detected original size and a magnification information entered from the operation unit 12, and a feeding operation for the sheet material S is initiated. In case a sheet of an appropriate size is absent, such situation is displayed on an LCD 73 constituting a display unit.

After the depression of a start key 70, a shading correction is executed, then a scan reading operation is executed from the leading end of the original, and a read signal is subjected to an A/D conversion by the image processing relay board 611 in the image reading portion 11 and is transmitted to a read image processing portion 52 in the main body of the apparatus. The contact image sensor 606 and the image processing relay board 611 are electrically connected by an unillustrated flat cable. After the scanning, the reading drive motor 613 rotates in a reverse direction to return the contact image sensor 606 to an original stand-by position.

(ADF)

Configuration and operation of the original conveying portion 10 are as follows. An original stacking table 21 is provided with a slider 21a which is slidable in a direction perpendicular to the conveying direction of the original D (direction of width of original D), and such slider 21a can align both sides of the originals D stacked on the original stacking table 21.

When an original D is stacked on the original stacking table 21, an original detection sensor 21b detects the presence of the original, and a size of the original is detected by a length detection sensor 21c and a width detection sensor 21d executing a detection by a displacement amount of the slider 21a. The original size information is transferred to the control portion 6 in the main body 1 of the apparatus, and a sheet of a predetermined size is selected according to a magnification entered from the operation unit 12. In case a sheet of an appropriate size is absent, such situation is displayed on the LCD 73.

In case the original detection sensor 21b does not detect an original, it is assumed that the original is placed on the original supporting glass 601 for stationary image reading, and the contact image sensor 606 scans the original supporting glass 601.

In case the original detection sensor 21b detects an original, in response to a depression of the start key 70 on the operation unit 12, the contact image sensor 606 at first executes a shading correction. Then the contact image sensor 606 moves to and stops under the running-reading glass 602 positioned opposite to the original supporting glass 601 across the jumping table 602.

The plural originals D stacked on the original stacking table 21 are separated one by one, by means of a separating pad 22a and a separating roller 22b in contact therewith, and guided and conveyed to a U-turn path 22d by an original conveying roller 22c.

Then the original D is conveyed, after passing an original leading end sensor 22f, by a feeding roller 22e etc. to a first image reading portion 615. Then, at a timing when the leading end of the image reaches the image reading position where the contact image sensor 606 is stopped, the contact image sensor starts a scanning of the original image. Then, thus obtained image signal is subjected to an A/D conversion in the image processing relay board 611 and is transferred to the read image reading portion 52 of the main body 1 of the apparatus.

In the first original reading portion 615, the image information of the original D is read while the original D is maintained close to the running-reading glass 602 by an original pressing roller 22g.

The original D is scooped up from the upper surface of the running-reading glass 602 by the jump table 603, and is discharged through an original discharge roller 22h to an original discharge tray 23.

When all the originals on the original stacking table 21 are read and the original detection sensor 21b detects "original absent", the contact image sensor 606 returns to the original stand-by position.

(Cassette)

The cassette feed portion 3 is provided with a feeder portion 301 detachably mounted on the main body 1 of the apparatus, and a feed cassette 302 detachably mounted on the feeder portion 301.

The feeder portion 301 has a function as a structured member for supporting the main body 1 of the apparatus from under, and plural feeder portions may be connected under the main body 1 of the apparatus.

The feed cassette 302 is provided with a cassette inner plate 304 for stacking a sheet bundle, a side regulating plate 306 for aligning the sheet bundle in a direction of width, and a rear end regulating plate 307 for aligning the rear end of the sheet bundle.

The sheet S is aligned at a lateral edge by the side regulating plate 306, which is provided slidably according to the sheet size, thereby being prevented from a skewed feeding or a feeding failure.

An image is recorded on a lower surface side of the sheet S stacked on the feed cassette 302. The presence/absence of the sheet S is detected by a cassette sensor (not shown). The aforementioned feed cassette 302 in the present embodiment is capable of stacking about 500 sheets, and can be extracted toward the front side of the main body 1 of the apparatus (front loading method). Also the feed cassette 302 can accommodate sheets of various sizes (for example 6 types of A4, A5, B4, B5, letter and legal).

In the sheet bundle stacked on the feeding cassette 302, an uppermost sheet S comes into contact with a pickup roller 303 and is advanced. The advanced sheets S is separated one by one by a feed roller 308 and a retarding roller 305 and is conveyed toward the downstream side. On a lateral end of the pickup roller 303, there is mounted a gear portion which receives a rotary power from a gear portion of the feed roller 308 through a planet gear 309.

In response to a trigger, signal for advancing the sheet S from the control portion 6 in the main body 1 of the apparatus, the pickup roller 303 receives a power from an unillustrated motor and executes an advancing operation for the sheet S by a power transmission through an unillustrated solenoid.

At the downstream side of the feed roller 308 and the retarding roller 305, there are provided a retry sensor 312 and an extraction roller pair 313. In case the sheet S is not detected by the retry sensor 312 even after a predetermined time from the trigger signal for driving the pickup roller 303, the control portion 6 again emits a trigger signal for driving the pickup roller 303 in order to advance the sheet S.

The sheet S is conveyed by the extraction roller pair 313. Then the sheet S is reversed by a conveying guide where the extraction roller pair 313 is positioned, a sheet U-turn guide formed by a part of a main body frame constituting a skeletal part of the main body 1 of the apparatus, and an MP guide 407 provided in the main body 1 of the apparatus.

The separated sheet S is detected, at the leading end thereof, by a top sensor 202. A jamming is identified in case the top sensor 202 does not detect the leading end of the sheet S within a predetermined time after the start of the feeding.

Also the cassette feed portion 3 is detachable from the main body 1 of the apparatus as described before, and it is also possible to add second and more cassette feed portions having a structure similar to that of the cassette feed portion 3.

(MP)

The MP feeding portion 4 is provided with an MP feeding roller 401, an MP separating pad 402, an MP inner plate 403, an MP tray 404, an MP extension tray 405, an MP inner plate spring (not shown) and a sheet regulating plate 406.

The sheet S may also be conveyed from the MP feeding portion 4, and plural sheets S are stacked on the MP inner plate 403 and conveyed, by a cooperation of the MP feeding roller 401 and the separating pad 402, to paired pre-transfer rollers 201 in the main body.

When the MP feeding portion 4 is used, the open-closable MP tray 404 is used for sheets of ordinary sizes. For a sheet of a size that cannot be stacked on the MP inner plate 403, the MP extension tray 405 is extracted to prevent a rear end of the sheet from hanging down from the MP tray 404. The MP inner plate 403 is urged upwards by the MP inner plate spring but is pressed down by a cam (not shown) in a stand-by state, thereby enabling to stack the sheet S on the MP inner plate 403.

In case the control portion 6 of the main body 1 outputs a signal for instructing the start of MP feeding, the cam (not shown) is rotated to release the MP inner plate 43 from the pressed-down state. Thus the stacked sheets S come into contact with the semicircular MP feeding roller 401 and are separated one by one and conveyed by a frictional separation by the MP separating pad 402. The separated sheet S continues to be pressed and conveyed by the MP feeding roller 451 and the MP separating pad 402, then joins the cassette feeding conveying path 314 and transferred to the paired pre-transfer rollers 201. A jamming is identified in case the leading end of the sheet S is not detected by the top sensor 202 within a predetermined time from the start of the feeding, as in the case of the cassette feeding portion 3.

(Registration)

Figure 9:
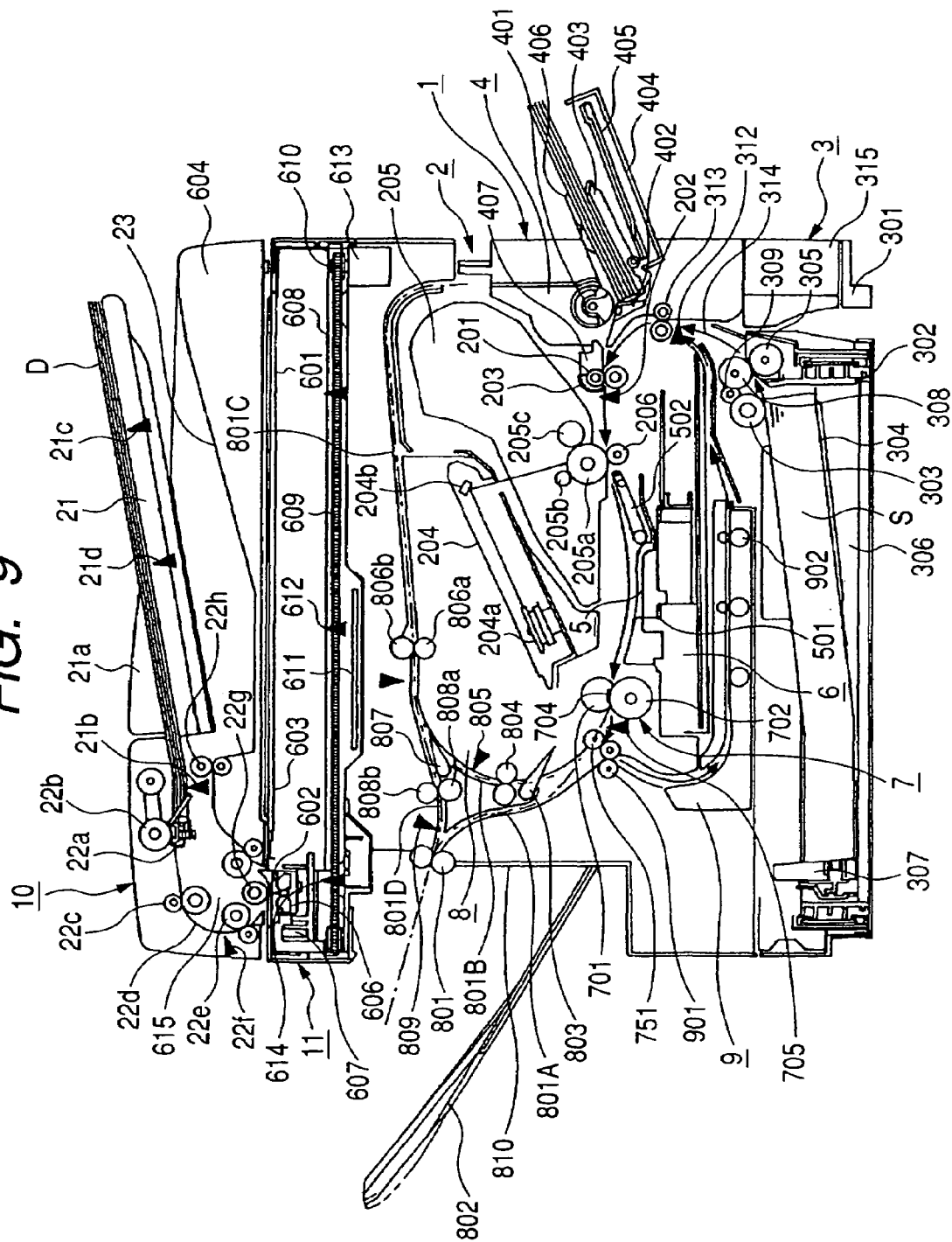
FIG. 9 is a schematic cross-sectional view of an image forming apparatus in an embodiment of the present invention.
Figure 10:
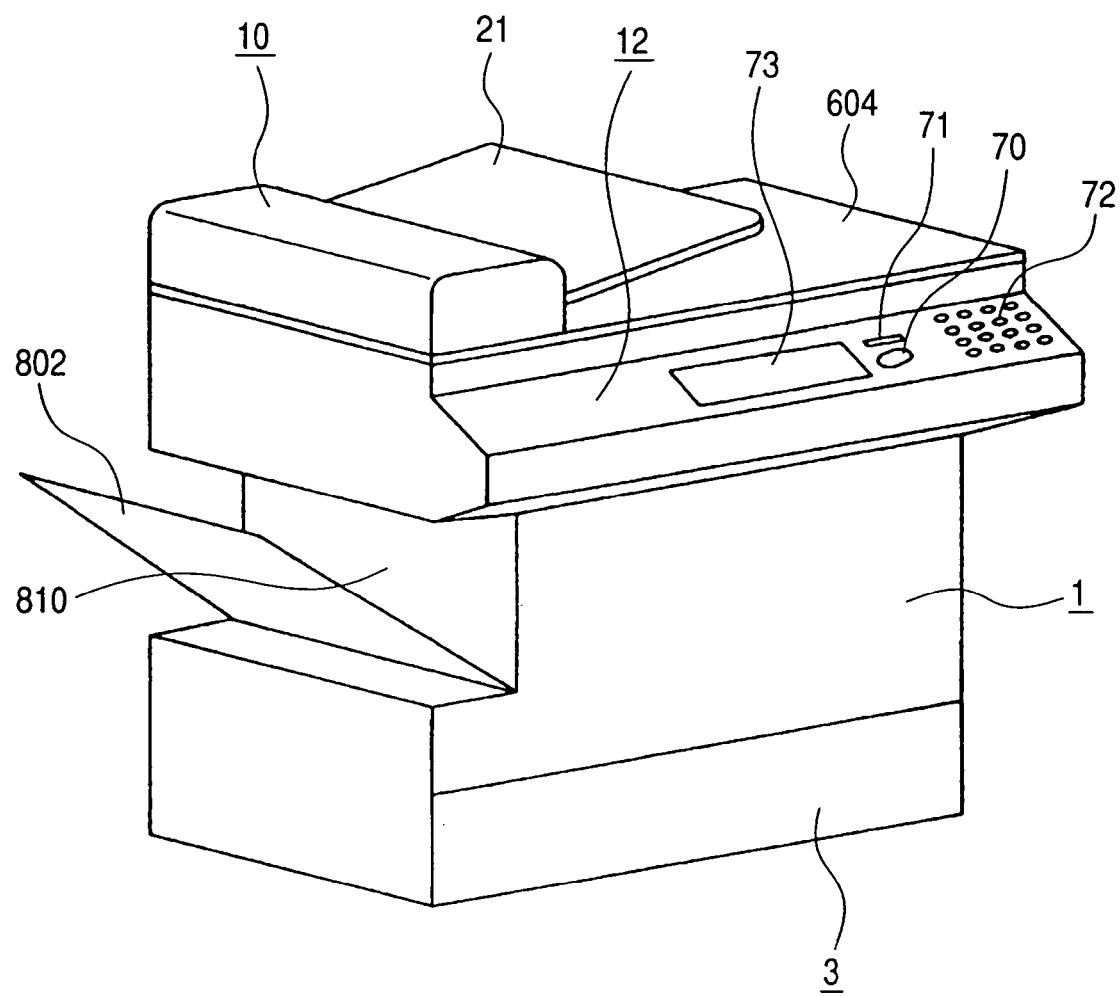
FIG. 10 is a schematic perspective view of an image forming apparatus in an embodiment of the present invention.

A registration shutter 203 is in a stand-by state, urged counterclockwise in FIG. 9 by a spring (not shown), when the leading end of the sheet S arrives. When the leading end of the sheet S impinges on an end portion of the registration shutter 203 and the sheet S continues to be fed by the MP feeding roller 401 or the extraction roller pair 313, a certain bend (loop) is formed therein. By a reaction force of such bend, the leading edge of the sheet S becomes parallel to the edge portion of the registration shutter 203 thereby correcting the skewing of the sheet S. When the sheet S still continues to be fed by the MP feeding roller 401 or the extraction roller pair 313, the force of such bend overcomes the force of the spring (not shown) urging the registration shutter 203, thereby advancing the sheet S, which is thus pinched in the nip of the pre-transfer roller pair 201.

(Image Forming Portion)

The image forming portion 2 is provided with an image forming portion, a sheet conveying portion 5 and a fixing portion 7. The image forming portion is constituted of a laser scanner 204, a toner-integrated recording cartridge 205, and a transfer roller 206, and the recording cartridge 205 can be detached in a direction to the right of the main body.

The laser scanner 204 is provided with a laser beam oscillator (not shown), a polygon mirror 204a, and a mirror 204b. The laser beam oscillator emits a modulation signal, and a laser beam based on such modulation signal is deflected by the polygon mirror 204a as a scanning light, which is reflected by the mirror 204b and irradiates a photosensitive drum 205a.

(Recording Cartridge (Process Cartridge))

The photosensitive drum 205a is incorporated in the recording cartridge 205, together with a charging roller 205b, a developing sleeve 205c, a cleaning blade and a toner hopper. The surface of the photosensitive drum 205a is uniformly charged by the charging roller 205b, and is irradiated by the scanning light from the laser beam oscillator whereby a latent image is formed. Such latent image is developed into a visible image by the toner supplied from the developing sleeve 205c.

(Sheet Conveying Portion)

The sheet conveying portion 5 has a function of conveying a sheet S, onto which the toner image formed on the photosensitive drum 205a is transferred by the transfer roller 206, to the fixing portion 7. A sheet conveying guide 501 includes a conveyor belt 502 and assists sheet conveying from the downstream side of the photosensitive drum 205a to the fixing portion 7, thus capable of conveying even a sheet S shorter than the conveying path length between the photosensitive drum 205a and the fixing portion 7, without disturbing the toner image.

(Fixing Portion)

In the sheet conveying path at the downstream side of the image forming portion, there are provided a fixing portion 7 and first discharge roller pair 751. The fixing portion 7 is constituted for example of an endless fixing film 701, a pressure roller 702, a pressure spring (not shown) for urging the pressure roller 702 toward the endless fixing film 701, and a fixing frame supporting these components. Inside the endless fixing film 701, there is provided a heater 704, and a temperature sensor (not shown) is provided in contact with the surface thereof.

The endless fixing film 701 is formed by a thin film of a thickness for example of about 40 μm, and is rotated by a driving power of the pressure roller 702. The heater 704 is formed by a linear heating member of a low heat capacity, and can achieve a shorter start-up time to a predetermined fixing temperature and an electric power saving, as the endless fixing film 701 is thin.

The sheet S is conveyed according to the signal from the top sensor 202, in such a timing that leading end of the toner image formed on the photosensitive drum 205a coincides with the leading end of the sheet S. After the transfer of the toner image, formed on the photosensitive drum 205a, by the transfer roller 206, the sheet S is conveyed along the sheet conveying portion 5, and, after the toner image fixing in the fixing portion 7, the sheet S is discharged to the discharge path by the paired discharge rollers 751. A fixing sensor 705 is provided immediately in front of the paired discharge rollers 751, and a jam is identified in case the leading end of the sheet S is not detected within a predetermined time from the top sensor 202.

(Reversal Discharge Portion)

In the downstream side of the fixing portion 7 in the conveying direction of the sheet S, there are provided a discharge roller pair 8 as sheet discharge means which discharges the sheet S, after the fixing in the fixing portion 7, from a lateral side of the main body 1 of the apparatus. A discharge tray 802 for stacking the sheet discharged from the discharge roller pair 801 is provided on the lateral face of the main body 1 and under the discharge roller pair 801, with an inclined position of a sheet stacking surface which is lower at the side of the main body and is inclined upwards at a position farther from the main body.

Between the fixing portion 7 and the discharge roller pair 801, there is formed a discharge conveying path 801A which stands up from the downstream side of the fixing portion in the sheet conveying direction to the discharge roller pair 801.

The sheet S, conveyed through the discharge conveying path 801A and stacked on the discharge tray 802 by the discharge roller pair 801, is discharged with an image bearing side upward (so-called face-up discharge). Such face-up discharge of the sheet S, with the image bearing side upwards, has an advantage that a copying state can be immediately recognized. Above the image forming portion 2, there is provided a reversal discharge portion 8 which reverses the sheet S, on which the toner image is fixed on an upper surface in the fixing portion 7, for supply to the discharge roller pair 801. Thus, the reversal discharge portion 8 is provided in an upper part of the main body 1, opposite to the cassette feeding portion 3 across the image forming portion 2.

The reversal discharge portion 8 is provided with a reversal conveying path 801B, branched from the discharge conveying path 801A provided at the downstream side of the fixing portion 7, and a reversal stay path 801C positioned, facing the upper surface of the main body 1, in continuation to the reversal conveying path 801B. The reversal discharge portion 8 is further provided with a reversal discharge path 801D, branching from a connecting position of the reversal conveying path 801B and the reversal stay path 801C and guiding to the discharge roller pair 801.

At the entrance of the reversal conveying path 801B, there is provided a first flapper 803, which is so constructed, by a switching operation thereof, as to select whether the sheet S conveyed form the fixing portion 7 is conveyed directly to the discharge roller pair 801 or to the reversal conveying path 801B. Also at the downstream side of the reversal conveying path 801B from the first flapper 803, there are provided a merging roller pair 804, and a reversal discharge path sheet sensor 805 is provided above the paired confluence rollers 804.

At the entrance of the reversal stay path 801C, there are provided a reversal roller 806a and a reversal idler-roller 806b. The reversal roller 806a and the reversal idler-roller 806b are rendered rotatable in the forward or reverse direction by drive means such as a motor, and convey the sheet S to the reversal stay path 801C by a forward rotation and to the reversal discharge path 801D by a reverse rotation.

The reversal stay path 801C has an end portion which is so bent as to be directed along the lateral face of the main body 1. Therefore, regardless of the sheet size, the leading end of the sheet S does not protrude to the exterior of the main body 1.

At the entrance of the reversal discharge path 801D, there is provided a second flapper 807. The second flapper 807 is so constructed that, in a normal state, an end portion thereof is urged for example by a spring to close the exit of the reversal conveying path 801B. The urging force of the second flapper 807 by the spring or the like is selected suitably weakly whereby the second flapper 807 is pushed up by the leading end of the sheet S conveyed toward the reversal stay path 801C thereby allowing the sheet S to pass toward the reversal stay path 801C. The second flapper 807 may also be so constructed as to be switched, for example by a solenoid, to the conveying paths in a predetermined passing timing of the sheet S.

Between the second flapper 807 and the discharge roller pair 801 there are provided an intermediate conveying roller 808a and an intermediate conveying idler-roller 808b. Also between the intermediate conveying roller 808a, the intermediate conveying idler-roller 808b and the discharge roller pair 801, a reversal discharge path sheet sensor 809 is provided.

The reversal discharge path 801D is so constructed as to merge with the discharge conveying path 801A immediately in front of the discharge roller pair 801.

The sheet S, conveyed to the reversal conveying path 801D and stacked on the discharge tray 802 by the discharge roller pair 801, is discharged with an image bearing side downward (so-called face-down discharge). Such face-down discharge of the sheet S has an advantage that pages can be easily arranged in a normal order.

(Two-Side Conveying Portion)

A two-side conveying portion 9 is provided in a lower part of the main body 1 of the apparatus. When a rear end of the sheet S after passing the fixing portion 7 is detected by a fixing sensor 705, the merging roller pair 804 and the reversal roller 806a are rotated in reverse direction by drive means such as an unillustrated motor, in response to an image signal released from the control portion 6 after a predetermined time.

The sheet S is conveyed to the two-side conveying portion 9, by the paired fixing discharge rollers 751 and a two-side conveying roll 901 maintained in contact with the fixing discharge roller pair 751. The sheet S conveyed to the two-side conveying portion 9 is subjected to an end alignment by a skew roller pair 902, then conveyed again to the main body 1 of the apparatus and merges with the cassette feed conveying path 314.

(Cover)

In the main body 1 of the apparatus, the upper body 13 integrally containing the original conveying portion 10 and the image reading portion 11 is rendered openable from and closable to the lower body 15, and, by opening the upper body 13, the recording cartridge 205 can be extracted from the main body 1 of the apparatus and can be replaced. Also the main body 1 of the apparatus is equipped with an interlocking mechanism (not shown), whereby the main body 1 does not function when the upper body 13 is opened or when the recording cartridge 205 is not set in the main body 1.

Also in case a sheet jam occurs during a recording operation, the sheet S remaining in the interior can be removed by opening either of the feed cassette 302, the upper body 13, the feed cover 315 or the discharge cover 810.

(Control System)

Figure 13:
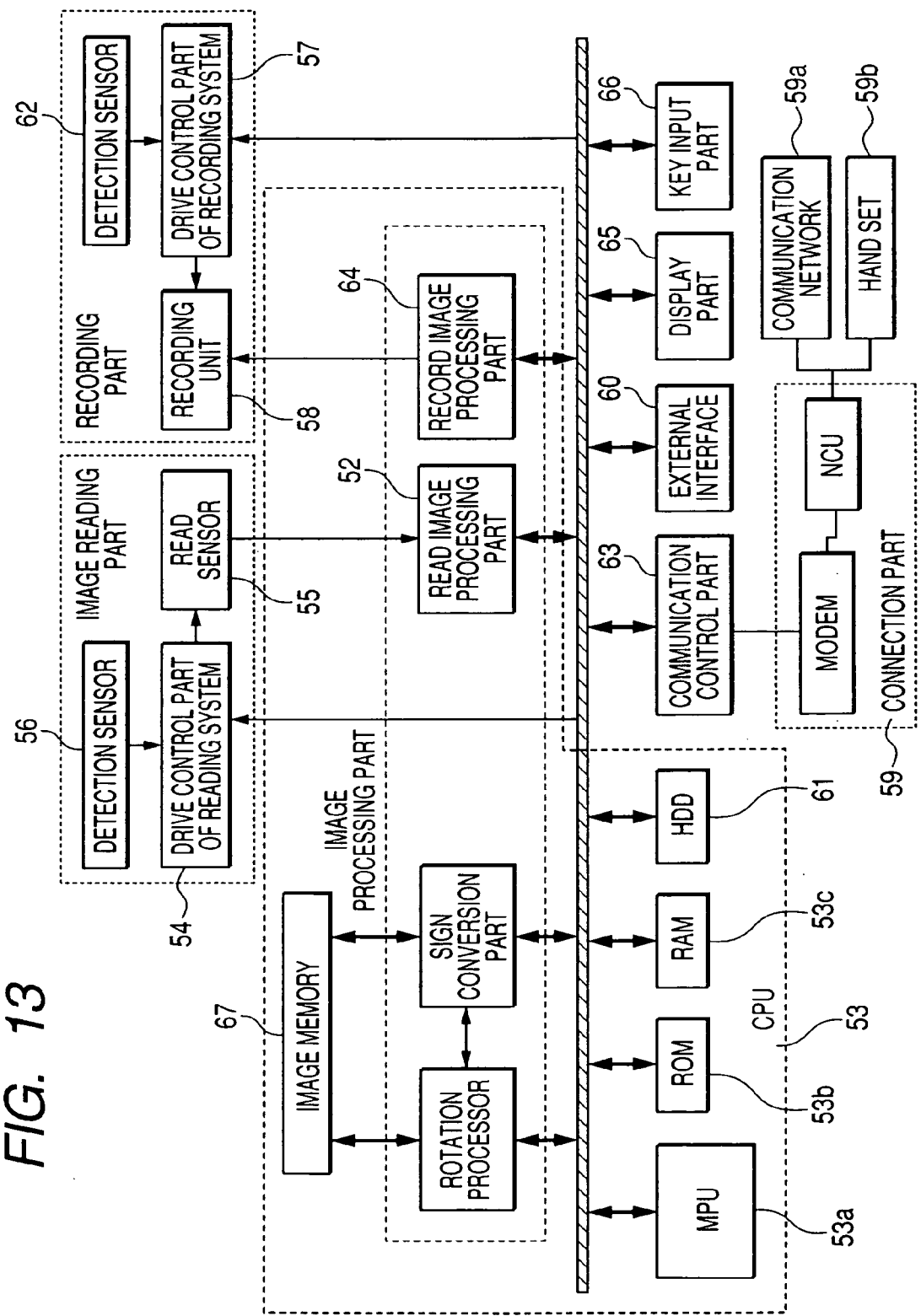
FIG. 13 is a block diagram of a control system of an image forming apparatus in an embodiment of the present invention.
Figure 14:
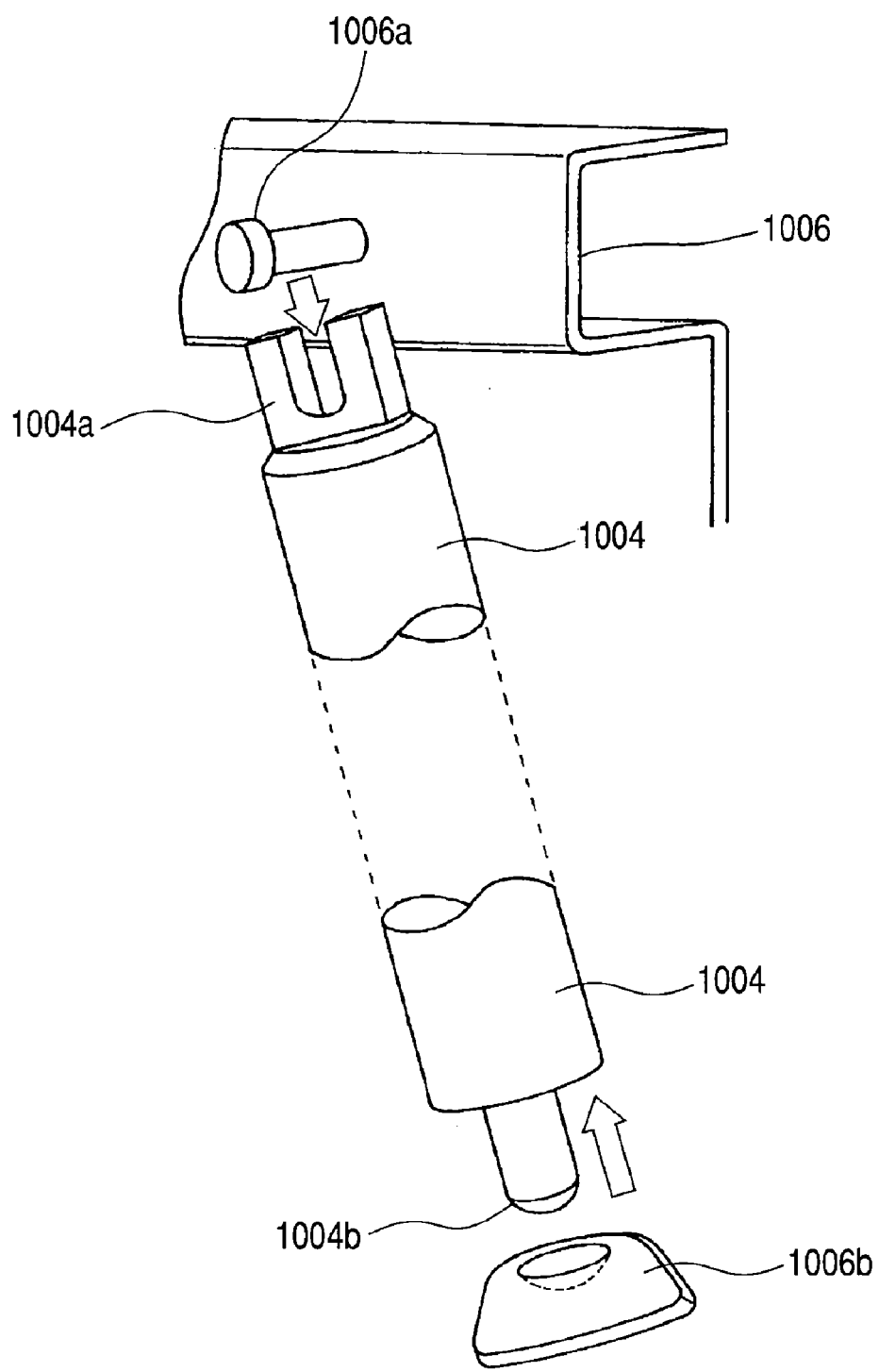
FIG. 14 is a view showing an apparatus equipped with a prior gas spring.

FIG. 13 is a block diagram of the control portion 6 of the image forming apparatus, utilizing the laser beam printer of the present invention. In FIG. 13, a CPU 53 for controlling the entire image forming apparatus is constituted, for example, of an MPU 53a, a ROM 53b for storing a control program for the MPU 53a and the like, a RAM 53c to be used as a work area for various data processing or a temporary memory for the image information, and an image processing portion for executing a change in the magnification or the resolution of the image.

The CPU 53 is equipped with a calendar, a clock function by a known structure. Within the RAM 53c, an area storing important system setting information such as one-touch key address information and software switch information is provided with a battery backup, thereby being protected from an unexpected failure for example by a power breakdown.

The operation unit 12 includes a key input portion 66 formed by various key switches such as a start key 70, a stop key 71, numeral keys 72 etc., and a display unit 65, including an LCD 73 for displaying various messages.

The image reading portion 11 is provided with a reading system drive control portion 54, such as for a reading motor, a reading sensor 55 for image reading, a read image processing portion 52 for executing a shading correction, a binarization, an edge enhancement, a smoothing etc. on the read image, and various sensors 56 for detecting the original.

The recording portion 4 is provided with a recording system drive control portion 57 such as for a recording motor, a recording unit 58 for controlling the laser scanner and the electrophotographic process, a recording image processing portion 64 for executing a smoothing on the image to be recorded, and various sensors 62 for detecting the sheet and the like.

In case the image forming apparatus of the present embodiment functions as a facsimile transmitter-receiver, the control system is constructed as follows. A communication control portion 63 for executing a call emission, a call reception and an image data encoding has a connecting portion 59 formed by a MODEM or an NCU, to which a communication network 59a and a handset 59b are connected. An external interface 60 executes a data transmission/reception directly with the CPU 53. This interface is connected with an external computer or a peripheral equipment through a channel such as RS232C, SCSI, LAN, USB, IEEE1394 or an infrared channel. Such connection allows the apparatus to be used as a scanner-printer of an external computer, or as a host equipment for the external peripheral equipment.

An HDD 61 is used, as a non-volatile memory of a large capacity, for storing image information and the like.

In the following, there will be given a detailed explanation, with reference to FIGS. 1 to 8, on the upper body 13 to be opened and closed at a jam processing or a replacement of the recording cartridge 205 in the image forming apparatus of the present invention.

Figure 2:
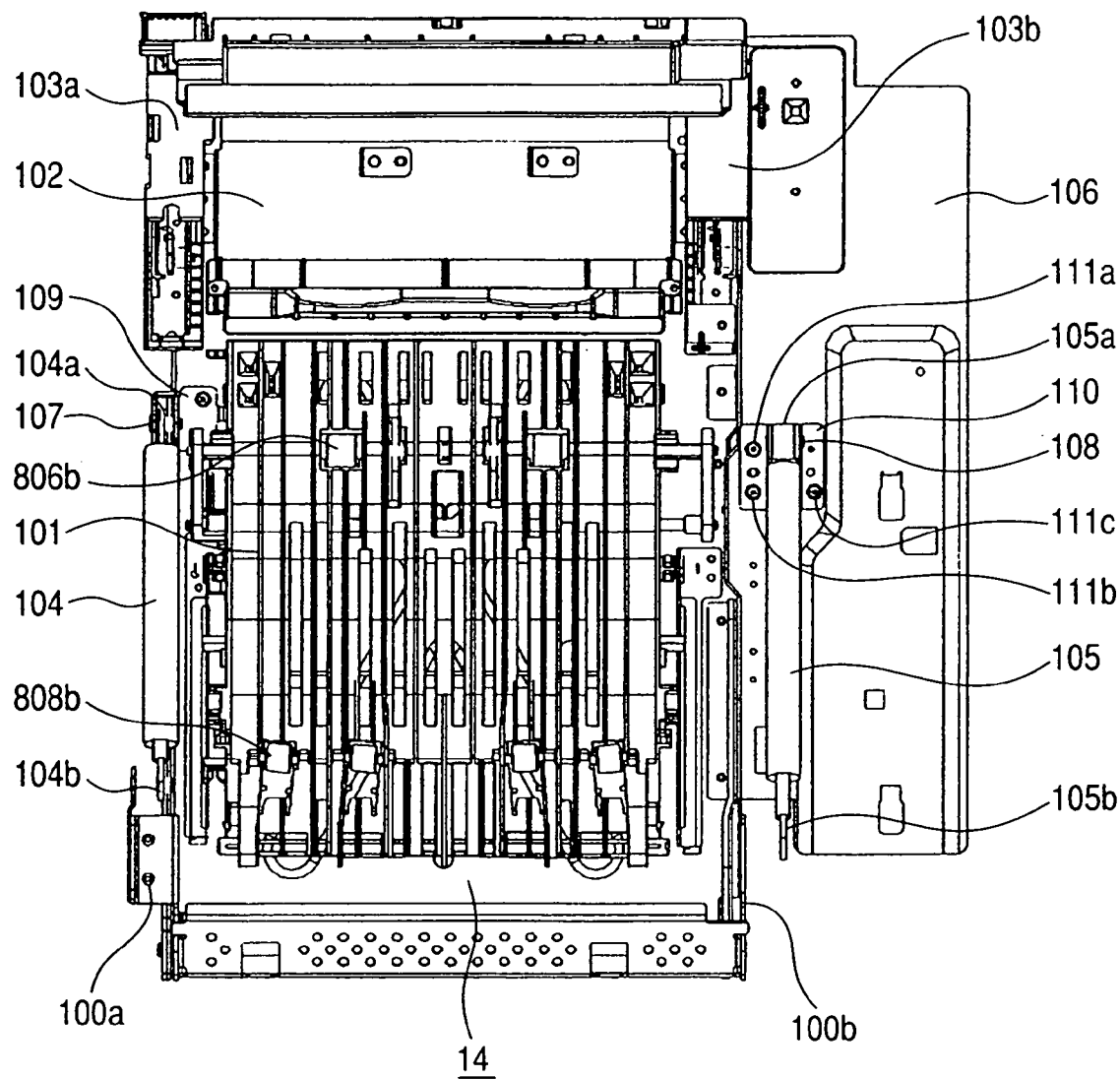
FIG. 2 is a schematic plan view, seen from below, of a lower open-close unit for the upper body in an embodiment of the present invention.
Figure 3:
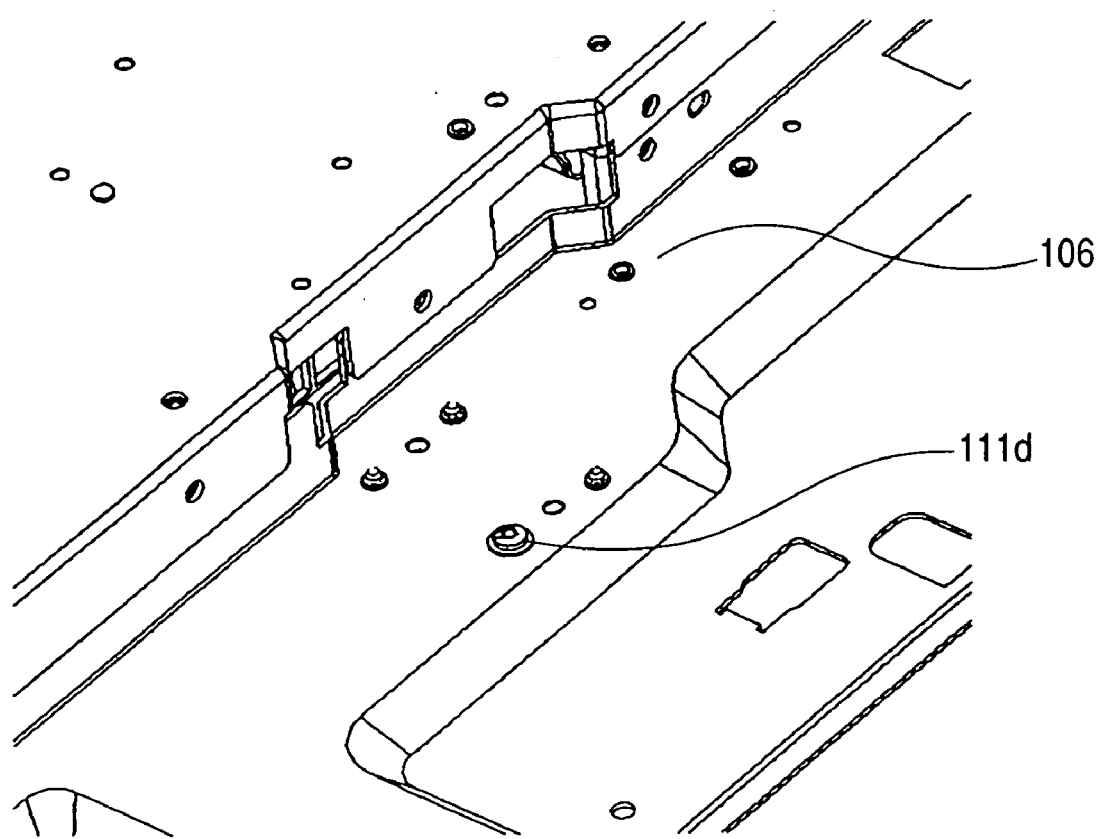
FIG. 3 is a schematic perspective view, seen from above, of a support mechanism of an upper body in an embodiment of the present invention.
Figure 4:
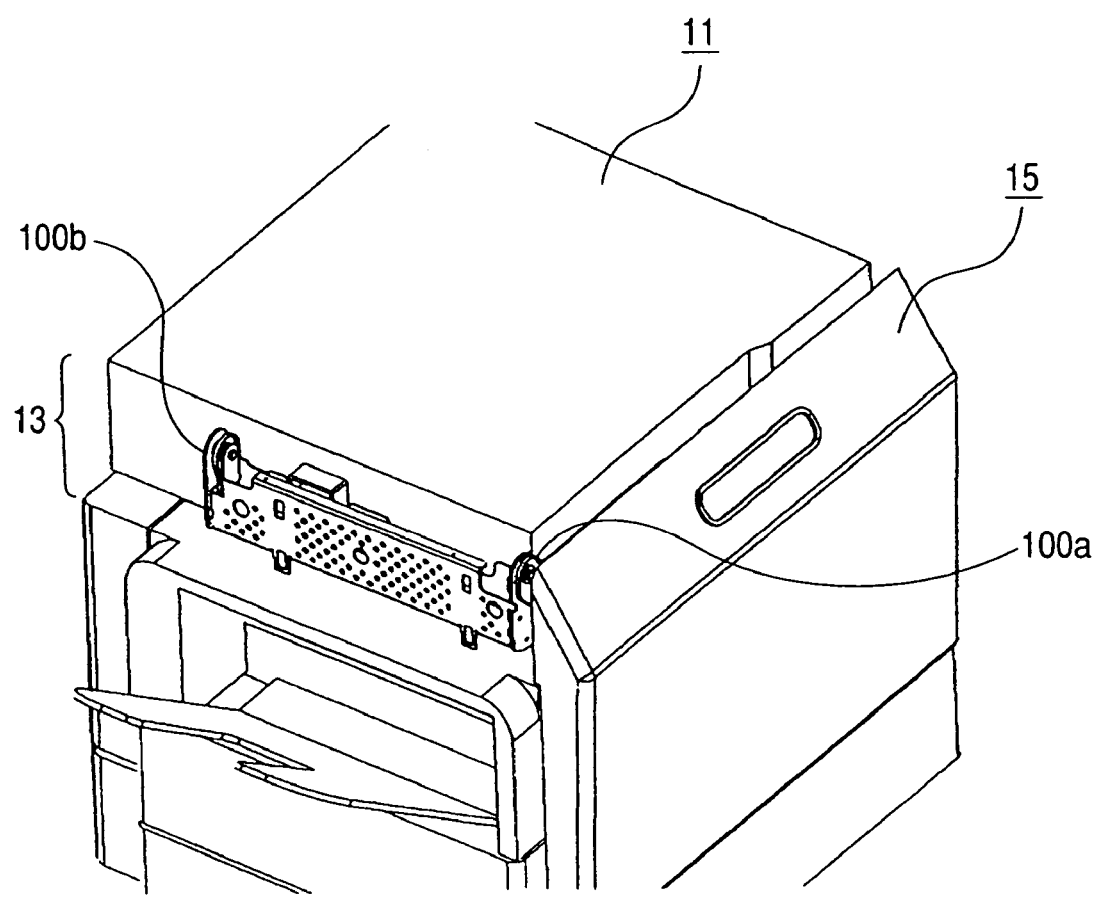
FIG. 4 is a schematic perspective view of a state in which an original conveying portion is detached from a main body of the apparatus in an embodiment of the present invention.
Figure 5:
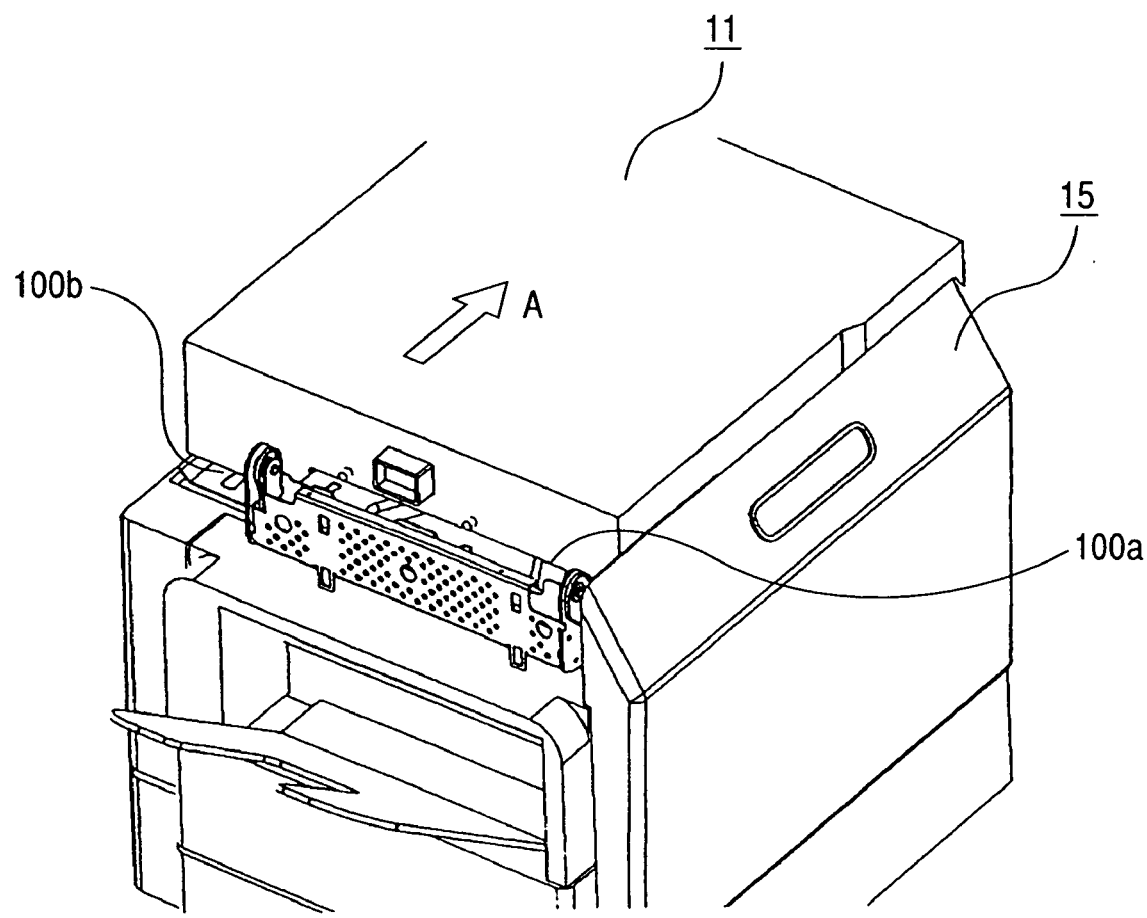
FIG. 5 is a schematic perspective view of a state in which an image reading portion is slid to a side from the main body of the apparatus in an embodiment of the present invention.
Figure 6:
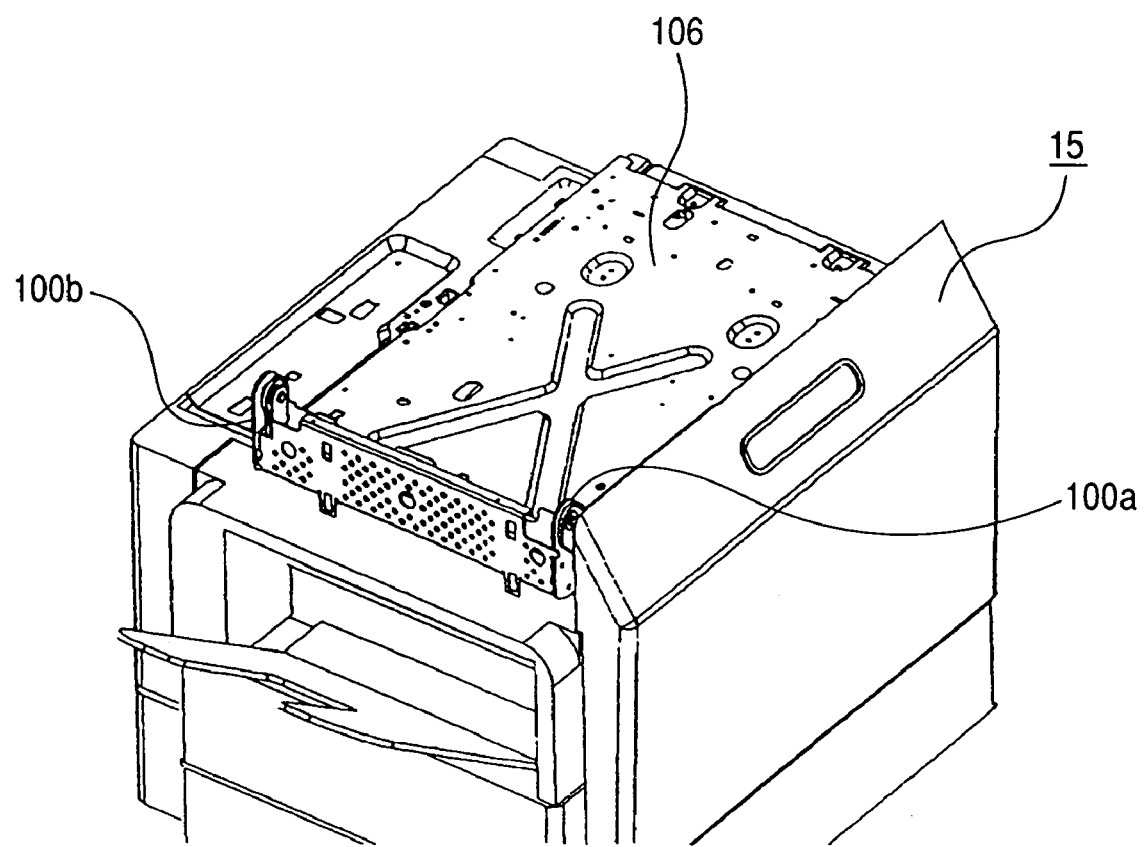
FIG. 6 is a schematic perspective view of a state in which an original reading portion is detached from the main body of the apparatus in an embodiment of the present invention.
Figure 7:
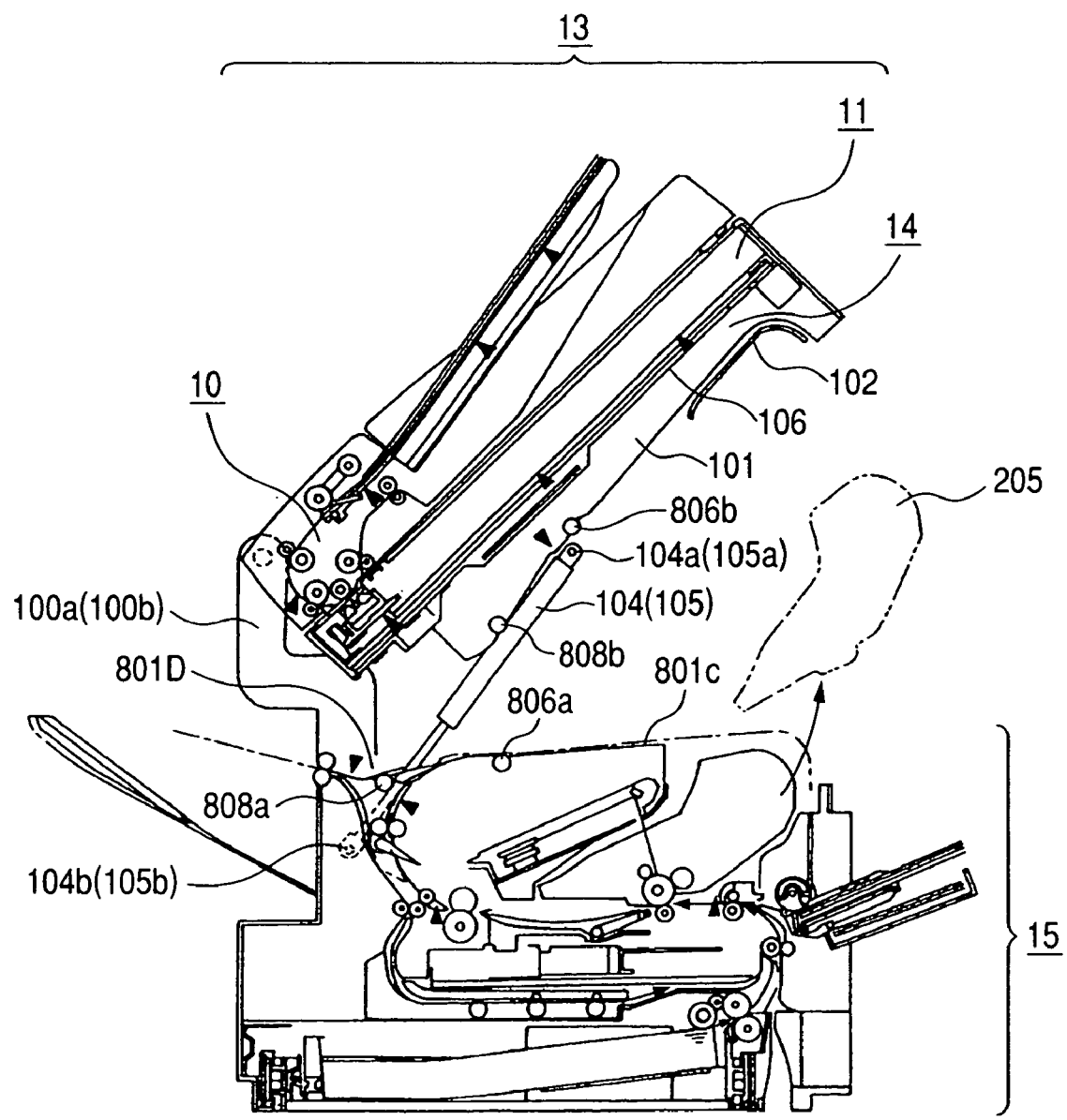
FIG. 7 is a schematic cross-sectional view showing an open state of an image forming apparatus in an embodiment of the present invention.

FIG. 1 is a schematic perspective view, seen from below (side of lower body), of an upper body support mechanism in the present embodiment; FIG. 2 is a schematic plan view, seen from below, of a lower open-close unit of the upper body; FIG. 3 is a schematic perspective view, seen from above, of an upper body support mechanism; FIG. 4 is a schematic perspective view of a state in which the original conveying portion 10 is detached from the main body 1; FIG. 5 is a schematic perspective view of a state in which the image reading portion 11 is slid from the main body 1; FIG. 6 is a schematic perspective view of a state in which the original reading portion 11 is detached from the main body 1; FIG. 7 is a schematic cross-sectional view showing an open state of the main body 1; and FIG. 8 is a schematic perspective view showing an open state of the main body 1.

Figure 8:
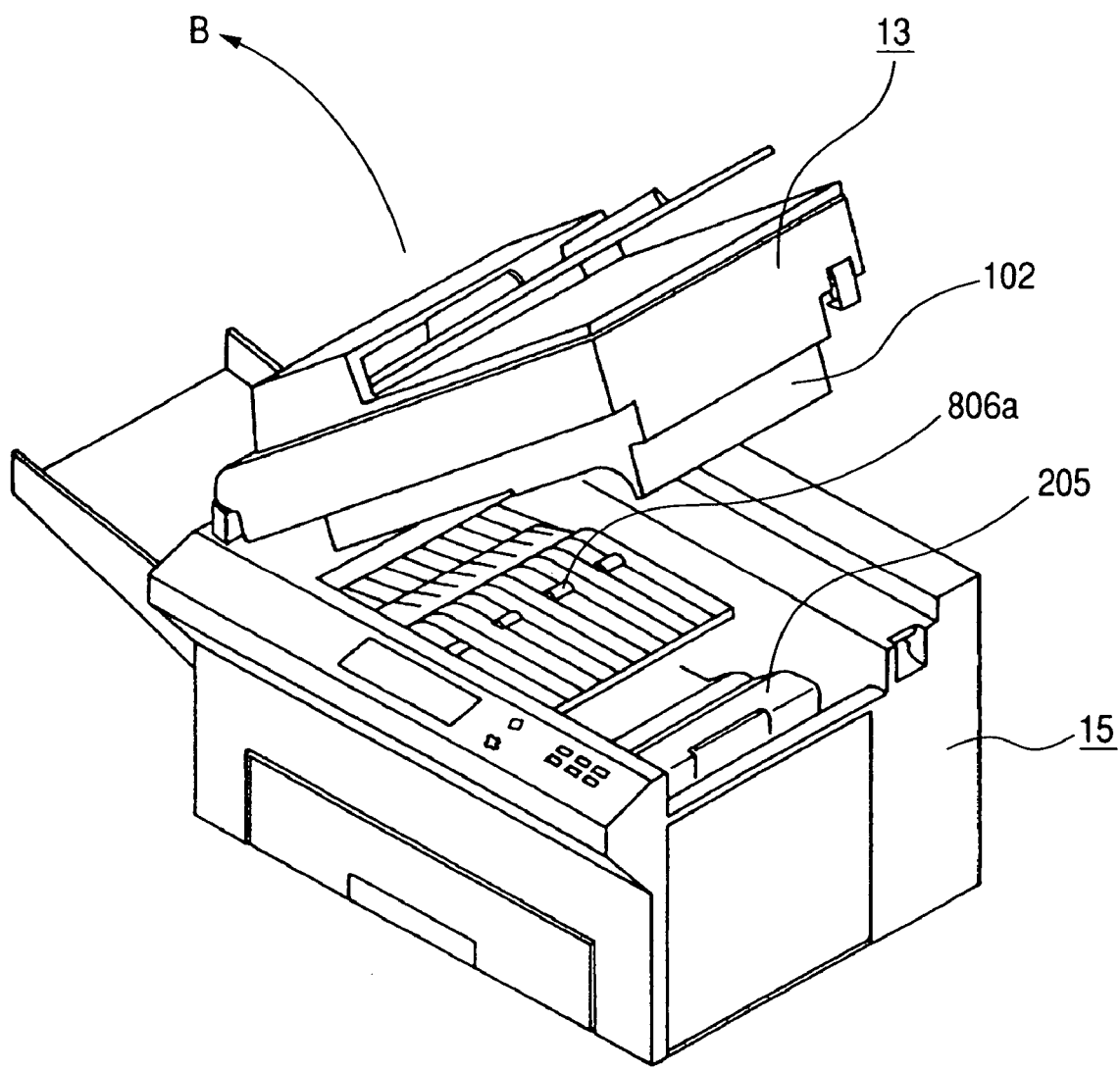
FIG. 8 is a schematic perspective view showing an open state of an image forming apparatus in an embodiment of the present invention.

As shown in FIGS. 7 and 8, the main body 1 of the apparatus is divided in upper and lower portions, and the upper body 13 is hinge coupled so as to be opened by pivoting to the lower body 15. The upper body 13 is provided with an original conveying portion (original conveying unit) 10, an image reading portion (image reading unit) 11, and an lower open-close unit 14 supporting the original conveying portion 10 and the image reading portion 11. The lower open-close unit 14 constitutes a first unit of the invention, and the original conveying portion 10 and the image reading portion 11 constitute a second unit of the invention. In the present embodiment, the second unit is constituted of plural units, but such configuration is not restrictive. The second unit preferably includes at least the image reading portion 11.

Hinge portions 100a and 100b are provided in a front-back direction of the main body 1, and the main body 1 can be opened and closed about a pivot shaft in a position same as the hinges 100a, 100b.

As shown in FIG. 7, by opening the upper body 13, the reversal stay path 801C and the reversal discharge path 801D are opened. In such state, the reversal idler-roller 806b and the intermediate conveying idler-roller 808b provided on the lower open-close unit 14 are respectively separated from the reversal roller 806a and the intermediate conveying roller 808a and pivot together with a reversal upper guide 101. The apparatus has an excellent jam processability as the reversal stay path 801C and the reversal discharge path 801D are widely opened.

An over-cartridge guide 102 is provided in the downstream side of the reversal upper guide 101 in the conveying direction, and constitutes the reversal stay path 801C together with the reversal upper guide 101. The over-cartridge guide 102 forms a conveying path above the recording cartridge 205. Therefore, a pivoting of the over-cartridge guide 102 in a direction B in FIG. 8 widely opens an aperture for the recording cartridge 205, thereby providing a satisfactory visibility and facilitating the extraction thereof by the user.

Also the presence of the over-cartridge guide 102 prevents a heat transmission from the sheet S, heated in the fixing portion 7, to the recording cartridge 205.

The lower open-close unit 14 is provided, as shown in FIG. 2, with lock members 103a, 103b in two positions in a front-rear direction of the main body 1, engaging with unillustrated lock engaging portions of the lower body 15, whereby the upper body 13 and the lower body 14 are mutually locked.

Gas springs 104, 105 constitute support members for supporting the upper body when it is opened. The gas springs 104, 105 show an example of elastic members. The gas springs are respectively provided at a front side and a rear side of the main body 1, and the gas spring 104 in front has a weaker repulsive force than the gas spring 105 positioned at rear (back side). The gas spring 105 at rear has a higher repulsive force because the original conveying portion 10 and the image reading portion 11 have centers of gravity deviated to the rear side of the main body 1.

The gas springs 104, 105 generate a force opposite to a rotating force of the upper body 13 by a weight thereof in a closing direction. Such force in the opposite direction suppresses the rotating force of the upper body 13 in the closing direction, thereby braking the upper body 13 rotating in the closing direction. In the present embodiment, the gas springs 104, 105 generates a repulsive, force larger than the rotating force of the upper body 13 in the closing direction by the weight thereof. Thus the gas springs 104, 105 support the upper body when it is opened.

The lock members 103a, 103b, receiving the repulsive force in excess of the rotating force of the upper body 13 in the closing direction by the weight thereof, securely engage with unillustrated lock engaging portions of the lower body 15.

As shown in FIG. 2, the gas springs 104, 105 are supported, at the gas spring end portions 104a, 105a, rotatably by rotary shafts 107, 108. The gas spring end portions 104a, 105a are fixed, through support members 109, 110 respectively supporting the rotary shafts 107, 108, to a lift plate of the lower open-close unit 14. Thus, the support members 109, 110 are provided at end portions of the gas springs 104, 105 at the side of the upper body.

On the lift plate 106, the image reading portion 11 is detachably mounted.

The other ends 104b, 105b of the gas springs 104, 105 are rotatably articulated on the lower body 15.

The gas spring may become weaker in the repulsive force by a deterioration in time, thus becoming unable to provide a necessary opening amount for the upper body. In such case, it becomes necessary to replace the gas spring. However the upper body is considerably heavy and the replacing operation is difficult to execute for the replacing workman (for example service personnel) as he has to hold the gas spring in one hand and to support the upper body by another hand.

Therefore, the present embodiment improves the replacing operability of the gas springs 104, 105.

In the following, there will be given a detailed explanation on the detachment of the gas spring 105 positioned at the rear (back) side of the main body 1.

The support member 110 supporting the gas spring 105 is fixed, by fastening screws (fastening members) 111a, 111b, 111c, 111d to the lower surface of the lift plate 106. Thus the support member 110 and the fastening screws 111a, 111b, 111c, 111d constitute a fastening portion for fastening the gas spring 105 to the upper body 13 (mainly lift plate 106).

Among these fastening screws, those 111a, 111b and 111c are so provided, as shown in FIGS. 1 and 2, as to fix the support member 110 from the lower side of the lift plate 106, while the fastening screw 111d is so provided, as shown in FIG. 3, as to fix the support member 110 from the upper side of the lift plate 106. Thus the fastening screw 111d in opposite, in mounting direction, to the fastening screws 111a, 111b and 111c.

Therefore, even when the fastening screws 111a, 111b and 111c are removed, the fastening screw 111d remains fixed to the upper surface of the lift plate 106 as shown in FIG. 3, so that the support member 110 cannot be detached form the lift plate 106. As shown in FIG. 4, the fastening screw 111d cannot be removed in a state where the image reading portion 11 is mounted on the upper body 13. Stated differently, the fastening screw 111d is provided in a position where a attach-detaching operation is inhibited by the mounting of the image reading portion 11. In summary, in a state where the image reading portion 11 is mounted on the upper body 13, an access is inhibited to at least a part of the fastening member, namely to the fastening screw 111d.

The image reading portion 11 is rendered separable (detachable) from the lift plate 106 by a sliding in a direction A shown in FIG. 5 and then a lifting. The upper surface of the lift plate 106 is rendered accessible as shown in FIG. 6, by sliding the image reading portion 11 in a direction A shown in FIG. 5 and then lifting it thereby separating it from the lift plate 106. Thus, when the image reading portion 11 is detached from the upper body 13, there is exposed a fastening portion which fixes the upper body 13 and the gas spring 105. In this state, there is exposed at least a part of the fastening member, namely the fastening screw 111d. In FIGS. 4 and 5, the image reading portion 11 alone is illustrated on the lift plate 106 for the purpose of simplicity.

In the present embodiment, the support member 110 is fixed to the lift plate 106 as described above. Therefore the configuration is such that, after the removal of the fastening screws 111a, 111b and 111c, the image reading portion 11 is separated from the lift plate 105 and then the fastening screw 111d is removed from the upper surface of the lift plate 106. In summary, the support member 110, rotatably supporting an end of the gas spring 105, is fixed to the lift plate 106 of the upper body 13, and cannot be detached from the lift plate 106 unless the original conveying portion 10 and the image reading portion 11 are separated from the upper body 13. The support member 110 can be detached from the lift plate 106 only through such procedure.

As explained above, the configuration is such that the original conveying portion 10 and the image reading portion 11 have to be detached from the upper body 13 (separated from the lift plate 106) in order to detach the gas spring 105. Through these operations, the weight of the upper body becomes the weight of the lower open-close unit 14 and thus becomes lighter, thereby improving the operability and the safety of the replacing operation of the gas spring 105.

In the foregoing there has been explained a case of detaching the gas spring 105 at the rear side of the main body 1, but the gas spring 104 at the front side may also have a similar configuration.

Embodiment 2

Figure 11:
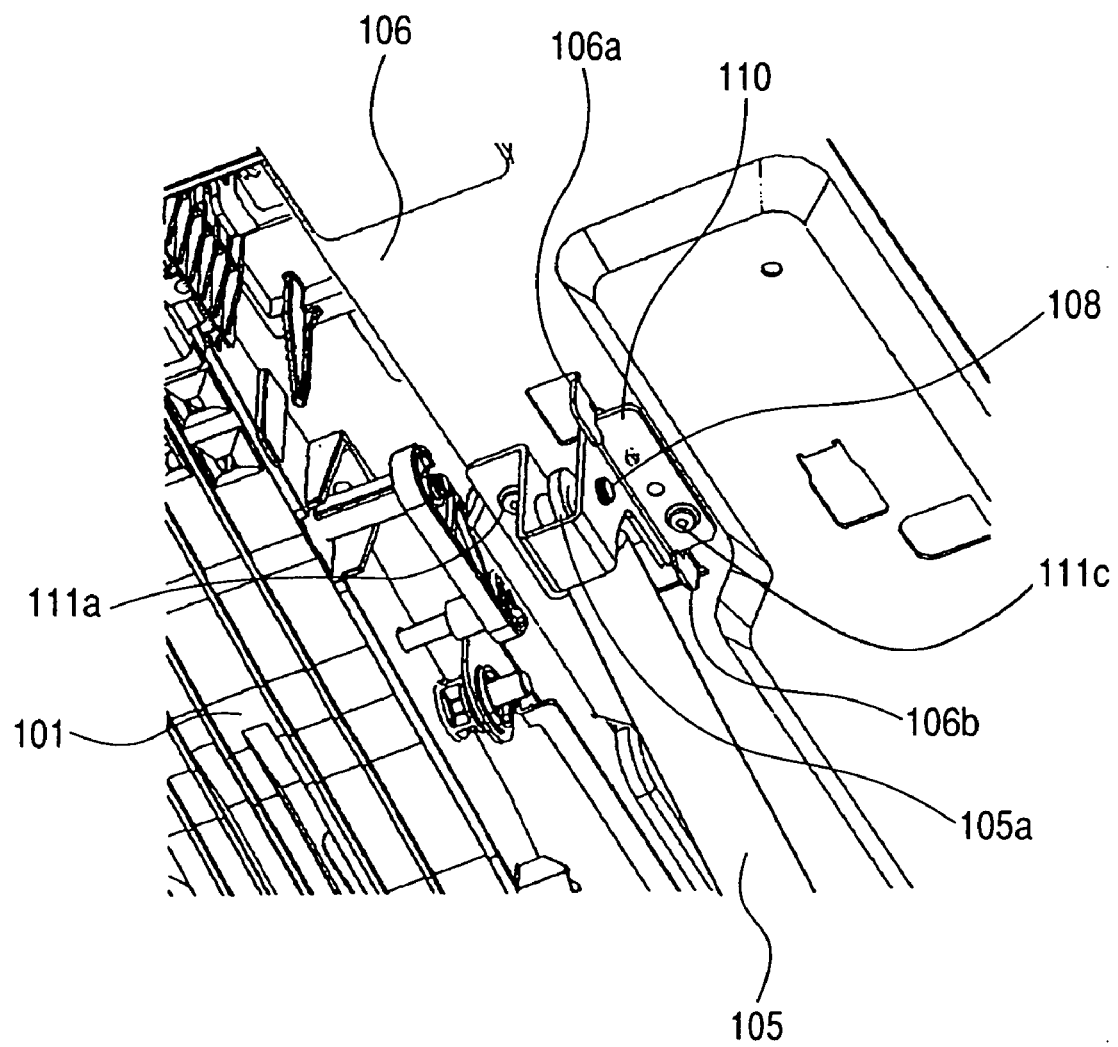
FIG. 11 is a schematic perspective view, seen from below, of a support mechanism of an upper body in another embodiment of the present invention.
Figure 12:
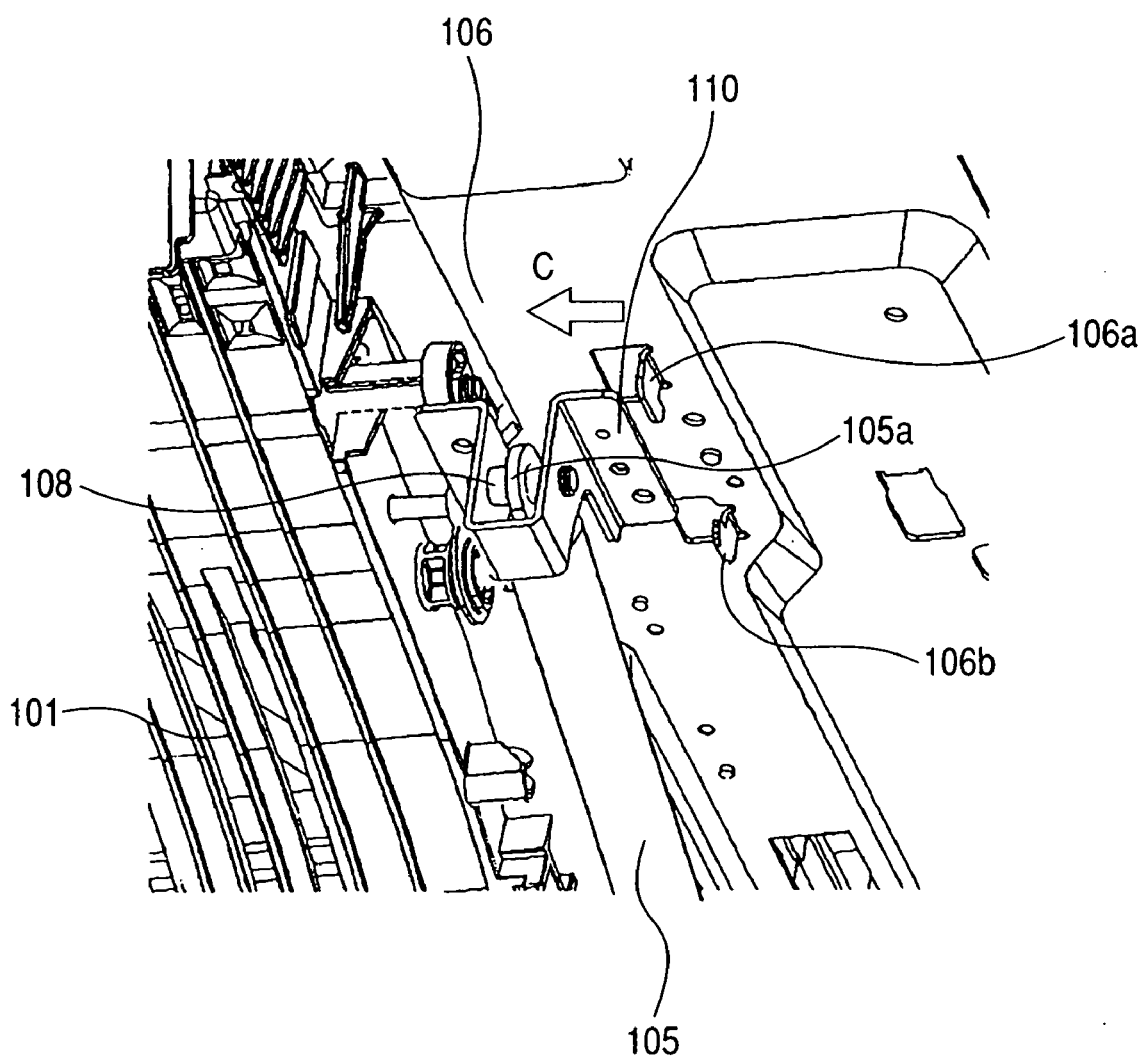
FIG. 12 is a schematic perspective view showing a detached state of a support mechanism of an upper body in another embodiment of the present invention.

FIGS. 11 and 12 are schematic view of an image forming apparatus of an embodiment 2 of the present invention, wherein FIG. 11 is a schematic perspective view of a support mechanism for an upper body, seen from below, and FIG. 12 is a schematic perspective view showing a detached state of the support mechanism for the upper body. In the following, components similar to those in the aforementioned embodiment 1 will be represented by similar symbols and will not be explained in repetition.

In the present embodiment, in a vicinity of the support member 110 for the lift plate 106 explained in the embodiment 1, ribs 106a, 106b are provided as regulating portions.

As the support member 110 in this case is mounted on the lower side of the lift plate 106, when all the fastening screws are detached, the gas spring 105 may become free from the lift plate 106 and the upper body 13 may be closed.

Therefore the ribs 106a, 106b are provided in a direction in which the support member moves when all the fastening screws are detached, whereby the support member 110 still engages with the lift plate 106 even after all the fastening screws are detached. The moving direction of the support member 110 is a direction in which the support member 110 or the gas spring 105 moves principally by the weight thereof.

At the replacement of the gas spring 105, there are executed operations, as in the embodiment 1, of removing the fastening screws 111a, 111b and 111c, then detaching the original conveying portion 10 and the image reading portion 11 from the lift plate 106, and removing the fastening screw 111d. Through these procedures, the support member 110 is rendered removable from the lift plate 106.

In these operations, the ribs 106a, 106b engage with the support member 110, whereby the lift plate 106 cannot be completely separated from the support member 110 by merely removing the fastening screws 111a, 111b, 111c and 111d. Therefore, the upper body 13 does not close even when the fastening screws 111a, 111b, 111c and 111d are removed.

In such state, the support member 110 and the gas spring 105 are made to slide in a direction C in FIG. 12, thereby releasing the engaging state of the lift plate 106 and the support member 110. The direction C is different from the direction in which the displacement is restricted by the ribs 106a, 106b, for example a direction substantially perpendicular to an imaginary place constituted by a rotating trajectory of the gas spring 105 when it is rotated. Thus the ribs 106a, 106b restrict the support member so as to be movable in a direction substantially perpendicular to an imaginary place constituting by the trajectory of the movement of the gas spring 105 along with the open-close operation of the upper body.

Owing to the above-described configuration, the gas spring 105 cannot be detached unless the lift plate 106 is supported by a hand. Also even if the lift plate 106 is erroneously released, the ribs 106a, 106b engage with the support member 110 to prevent the lower open-close unit 14 from closing, thereby improving the safety of the replacing operation.

Also in the present embodiment, as already explained in the embodiment 1, the original conveying portion 10 and the image reading portion 11 are always removed from the upper body 13 in case of detaching the gas spring 105. Through such operations, the weight of the upper body becomes the weight of the lower open-close unit 14 and thus becomes lighter, thereby improving the operability and the safety of the replacing operation of the gas spring 105.

Also in the present embodiment 2, there has been explained a case of detaching the gas spring 105 at the rear side of the main body 1, but the gas spring 104 at the front side may also have a similar configuration.

In the foregoing embodiments, there is employed a configuration in which the fastening portion is exposed by removing the original conveying portion and then the image reading portion from the upper body. However, depending on the weights of the image conveying portion of the image reading portion, there may be adopted a configuration in which the fastening portion is exposed by removing only the original conveying portion, or only the image reading portion.

The present invention has been explained by embodiments thereof, but the present invention is by no means regulated to such embodiments and is subject to any and all modifications within the technical scope of the present invention.

This application claims priority from Japanese Patent Application No. 2004-316114 filed on Oct. 29, 2004, which is hereby incorporated by reference herein.

What is claimed is:

1. An image forming apparatus comprising:
   a lower body;
   an upper body openable from and closable to the lower body, the upper body including a device for forming an image; and
   a support member for supporting the upper body when the upper body is opened;
   wherein a fastening portion for fastening the support member to the upper body is exposed when said device is detached from the upper body.

2. An image forming apparatus according to claim 1, wherein the fastening portion includes a fastening member for fastening the support member to the upper body; and
   the fastening member is exposed in at least a part thereof when said device is detached from the upper body.

3. An image forming apparatus according to claim 1, wherein the fastening portion includes a fastening member for fastening the support member to the upper body; and
   an access to at least a part of the fastening member is inhibited when said device is mounted on the upper body.

4. An image forming apparatus according to claim 1, wherein the support member is an elastic member capable of generating a force in a direction opposite to a moving force of the upper body in a closing direction thereof.

5. An image forming apparatus according to claim 1, further comprising:
   a holding member provided at an end portion of the support member at the side of the upper body, for holding the support member; and a fastening member for fastening the holding member to the upper body.

6. An image forming apparatus according to claim 5, wherein the holding member and the fastening member are provided in the fastening portion.

7. An image forming apparatus according to claim 5, further comprising a regulating portion for regulating a movement of the holding member in a direction in which the support member moves by a weight thereof.

8. An image forming apparatus according to claim 7, wherein the support member moves together with an opening/closing operation of the upper body; and the regulating portion limits the movement of the holding member in such a manner that the holding member is movable in a direction substantially perpendicular to an imaginary plane constituted by a moving trajectory of the support member.

9. An image forming apparatus according to claim 1, wherein said device is an image reading portion for reading an image of an original.

10. An image forming apparatus according to claim 1, wherein said device is an original conveying portion for conveying an original.

* * * * *

UNITED STATES PATENT AND TRADEMARK OFFICE
CERTIFICATE OF CORRECTION

| | |
|---|---|
| PATENT NO. | : 7,421,228 B2 |
| APPLICATION NO. | : 11/258200 |
| DATED | : September 2, 2008 |
| INVENTOR(S) | : Tomura |

It is certified that error appears in the above-identified patent and that said Letters Patent is hereby corrected as shown below:

ON THE COVER PAGE:
At Item (56), References Cited, Foreign Patent Documents, "JP 04359263 A 12/1992" should read --JP 4-359263 A 12/1992--, "JP 05048785 A 2/1993" should read --JP 5-48785 A 2/1993--, and "JP 07261490 A 10/1995" should read --JP 7-261490 A 10/1995--.

COLUMN 1:
Line 33, "a cumbersome work" should read --cumbersome work--.
Line 59, "replacing" should read --repair--.

COLUMN 3:
Line 27, "a display" should read --of a display--.
Line 30, "(an lower" should read --(a lower--.

COLUMN 4:
Line 16, "original is" should read --original as--.

COLUMN 5:
Line 56, "is separated" should read --are separated--.
Line 57, "and is" should read --and are--.

COLUMN 6:
Line 50, "transferred" should read --is transferred--.

COLUMN 8:
Line 46, "conveyed form" should read --conveyed from--.

COLUMN 10:
Line 64, "an lower" should read --a lower--.

UNITED STATES PATENT AND TRADEMARK OFFICE
CERTIFICATE OF CORRECTION

PATENT NO. : 7,421,228 B2
APPLICATION NO. : 11/258200
DATED : September 2, 2008
INVENTOR(S) : Tomura It is certified that error appears in the above-identified patent and that said Letters Patent is hereby corrected as shown below:

COLUMN 11:
Line 34, "generates" should read --generate--, and "repulsive," should read --repulsive--.

COLUMN 12:
Line 13, "replacing" should read --repair--, and "for example," should be deleted.
Line 14, "service personnel)" should be deleted.
Line 32, "in oppo-" should read --is oppo- --.
Line 38, "detached form" should read --detached from--.
Line 42, "a attach-" should read --an attach- --.

COLUMN 13:
Line 22, "view" should read --views--.

COLUMN 14:
Line 13, "in case of" should read --in the case of--.

Signed and Sealed this

Twenty-seventh Day of January, 2009

JOHN DOLL
*Acting Director of the United States Patent and Trademark Office*